June 17, 1958     T. M. McCONNELL     2,838,862
SCHEDULING DEVICE

Filed March 16, 1956     3 Sheets-Sheet 1

*INVENTOR.*
Thomas M. McConnell
BY
*ATTORNEY*

June 17, 1958  T. M. McCONNELL  2,838,862
SCHEDULING DEVICE
Filed March 16, 1956  3 Sheets-Sheet 2
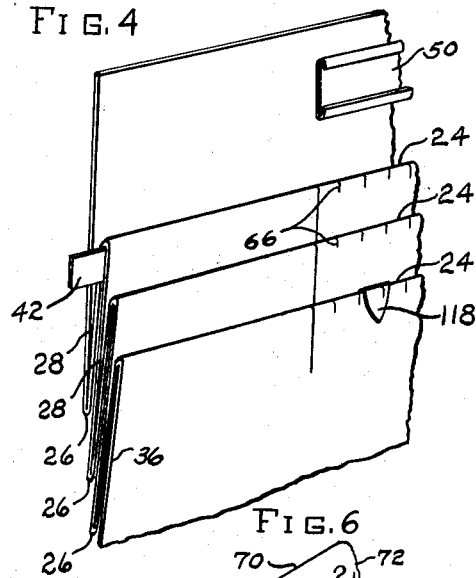
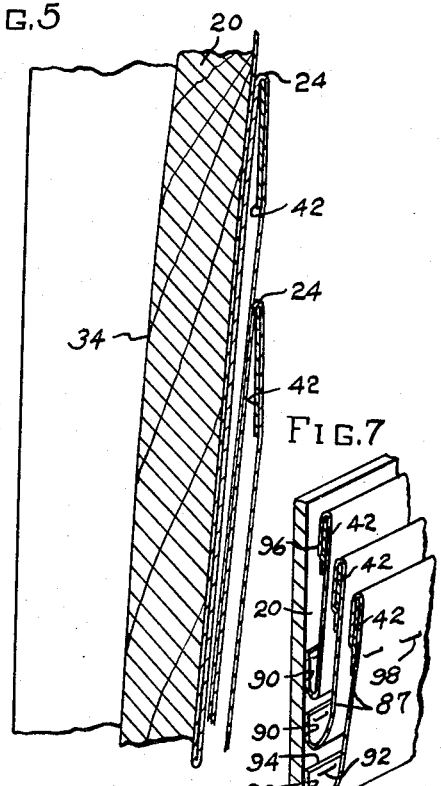
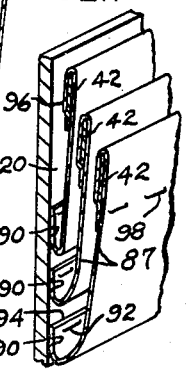
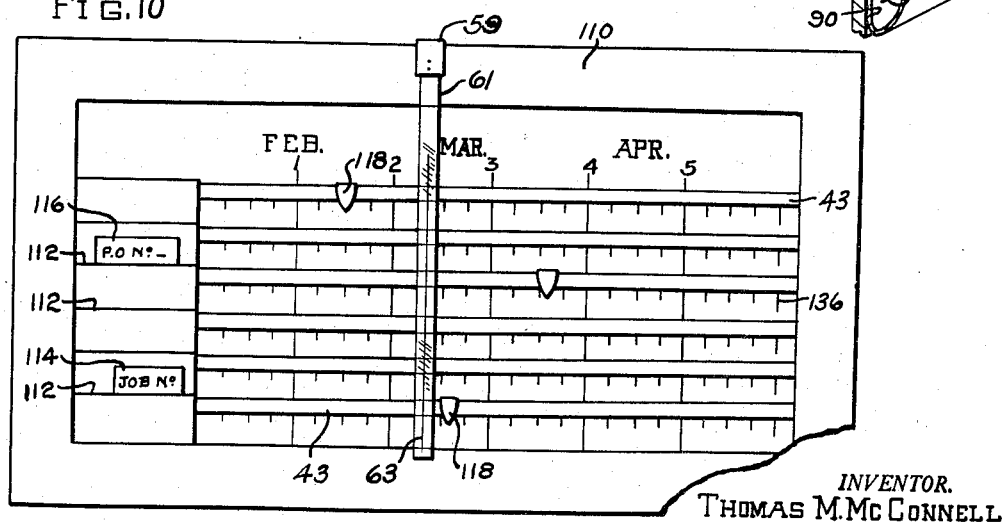
INVENTOR.
THOMAS M. McCONNELL
BY
*F. P. Keiper*
ATTORNEY June 17, 1958  T. M. McCONNELL  2,838,862
SCHEDULING DEVICE Filed March 16, 1956  3 Sheets-Sheet 3

INVENTOR.
THOMAS M. McCONNELL
BY
ATTORNEY

United States Patent Office 2,838,862
Patented June 17, 1958

2,838,862

SCHEDULING DEVICE

Thomas M. McConnell, Jamesville, N. Y.

Application March 16, 1956, Serial No. 572,021

10 Claims. (Cl. 40—124)

This invention relates to a production control or scheduling device.

In shop production it is the practice to schedule various operations of different jobs employing the various machines through a substantial period of time in advance. Such scheduling is essential to maintain efficient and substantially full time usage of the available facilities. It is also essential that raw materials and purchased parts be ordered sufficiently in advance to assure the receipt thereof at the proper time, or prior so that steady production, without interruption, or failure to have on hand at the right time the necessary materials, etc. can be had at all times. It is desirable, and essential that work be scheduled for several months in advance, and that material required at a future time be on order, and that all essentials and details of a particular over-all production and schedule be under constant surveillance, to the end that material and machines be in readiness at the required times.

The present invention is directed to a production control or scheduling board capable of providing a visible indication covering a period of time of the various stages in production and flow of material essential thereto. The invention is particularly directed to a board having flexibility, and adapted to provide a visual record of the stages of various operations, but also capable of storing information in respect to such operations in such a way as to make the information immediately available. The invention is further directed to a structure, the use of which may be readily understood, and which usage is relatively simple. More particularly the invention is directed to a multiple overlapping pocket construction capable of holding informational cards, for identifying various operations or items requiring scheduling, with scheduling means corresponding thereto associated with date indicating means.

The invention is further directed to a board of low cost construction having versatility as to its method of use.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 4 is a perspective fragmentary view of the pocket structure;

Figure 5 is a fragmentary enlarged sectional view taken on the line 5—5 of Figure 1;

Figure 6 is a fragmentary perspective view of an alternative pocket marker;

Figure 7 is a fragmentary enlarged sectional view of an alternative pocket structure;

Figure 10 is an elevational view of a modified form of schedule board;

Figure 1:
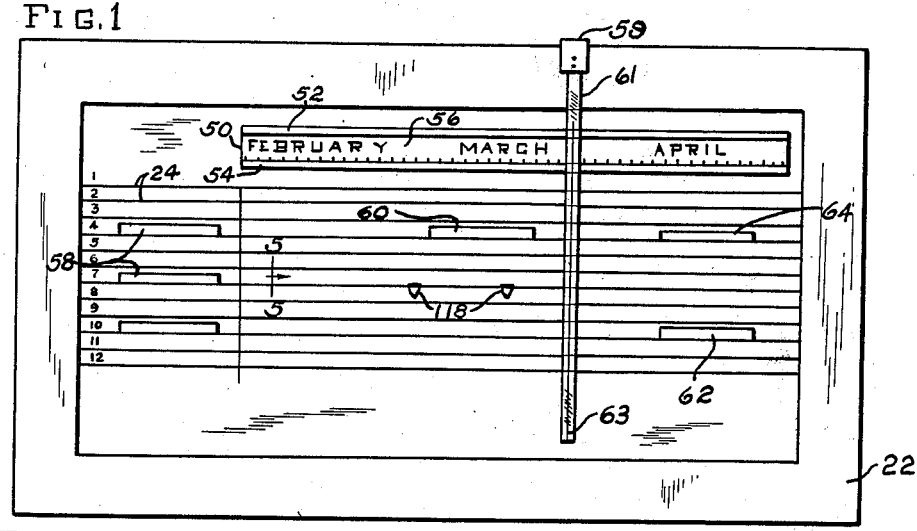
Figure 1 is a front elevational view of the schedule board.

Referring to Figures 1–5 inclusive there is shown a supporting board 20, and a surrounding generally rectangular frame 22. On the board is mounted a sheet of heavy paper, folded as is shown in Figures 4 and 5 to form a vertical row of relatively deep downwardly extending pockets and open at the top, each pocket extending across the entire width of the board. The upper edges or lips of such pockets are indicated by the reference character 24. As will be seen, a sheet of heavy paper, fibrous, or sheet plastic material is folded as at 26 and 24 to provide a series of pockets 28, as many as desired, depending on the number of orders or other items which it is desired to schedule, for reference from time to time. Such sheet is mounted upon the board between spaced vertical cleats 30 and 32. As shown in Figure 5 the board 20 may be somewhat concave as at 34 to provide the depth required by the multiple thicknesses of the pocket forming material resulting from the partially overlapping folds and the cleats 30 and 32 may present flat front faces, and be curved on their rear faces to seat upon the board face, and thus may be made somewhat thinner at the upper and lower ends. The end edges of the sheet, one edge being indicated at 36, will in practice abut the inside faces 38 and 40 of such cleats.

The individual upper folds of the sheet are supported upon thin metal straps 42, preferably of a width to afford vertical stiffness, which straps are secured to the board 20 at one end as at 44, by screws or other fastening means from which the straps may be detachable if desired by employing apertures large enough to pass over the screw heads. The straps are tensioned across the board by short coil springs 46 or equivalent means at their other ends, which springs may be removably hooked into the upstanding perforate flange of a vertical angle iron 48.

Above the uppermost pocket there is disposed a shallow channel 50 having inwardly bent opposed flanges 52 and 54 for receiving an elongated date strip 56, which strip may be replaced from time to time with strips bearing the desired months and days for a particular working period of the calendar year, three months being shown for example.

Across the top of the board is a U sectioned slide 59, adapted to be moved along the top of the board. From such slide, there depends a "today" line indicator 61, comprising a transparent strip of a length to depend across all of the pocket openings. Such strip is provided with a vertical centrally disposed "today line" or date line 63, and by shifting such a slide along the board each day, or such other work period increments as desired, the line will coordinate the instant day or time on the date strip 56, with the pockets 28. Thus quick reference can be had in respect to cards placed in the pockets as to the progress being made, and as to future commitments for the department, machine, or other operation requiring attention.

In Figure 1 there are shown job identification cards 58 and 60 in the portion of the pockets to the left of the date strip 56. In the same pockets, and beneath the date line are cards 62 and 64 which may be cut of such length as to represent any selected period of time. The cards 58, 60, 62 and 64 have a height equal to the depth of the pockets plus a substantial portion of the width of the exposed fold of the pocket behind and above the lip. Thus such cards may bear along their upper margin, which may be nearly a half inch wide if desired, such information as will quickly identify the card.

Along the upper lip or fold 24 of each pocket, graduations 66 may be applied, which graduations extend over the length of the lip of each pocket immediately below the date strip 56. If desired, the fold or lip of each pocket may be provided with a plastic strip, bearing such graduations, instead of placing the graduations directly on the folded pocket material directly. A form of plastic or thin metal strip adaptable to this purpose is shown in Figure 6. Such strip comprises a curled over upper edge 70, and an indicia bearing portion 72, below which is a flange or skirt 74, the latter being provided with prongs 76 at suitably spaced intervals for piercing the folded pocket forming material. If desired, the flange or skirt may be secured to the pocket forming material by staples such as 77. Such a strip protects the edge or lip of each pocket to which it is applied, and the rounded upper edge facilitates the insertion and removal of cards from the pocket behind. Also, the shoulder formed as at 78, immediately above the skirt or flange 74, may engage the upper edge of cards disposed in the pocket and thereby tend to prevent accidental dislocation of such cards.

Figure 8:
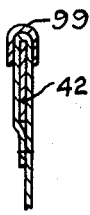
Figure 8 is a fragmentary enlarged sectional view of a variation of Figure 6.
Figure 9:
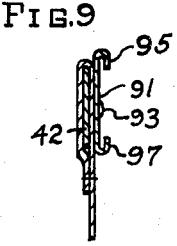
Figure 9 is a fragmentary enlarged sectional view of a further variation of Figure 7.

In the modified form shown in Figure 7, the individual pockets are formed from individual sheets or strips of heavy paper 87 or other sheet material instead of a single sheet having multiple folds as indicated in Figures 4 and 5. In such arrangement each strip is provided with a narrow marginal portion 90 along its lower edge which is folded upward and attached to the board 20 as by brads or staples 92 and adhesive if desired. The width of such marginal portion will preferably exceed the spacing between pockets, so that the upper edge 94 thereof can be "shingled" under the marginal portion 90 of the pocket forming strip above. The upper edges of the pocket forming strips, are provided with a flat loop fold 96 to embrace the metal supporting straps 42 and such folds may be stapled closed along the lower margin as at 98. A metal bead of inverted U section may be applied over the fold as at 99 (see Figure 8), such bead being clamped over the folded sheet material for suitable grip, and adhesive between the bead and sheet material may also be employed. If desired, the exposed face of the fold can be provided with a shallow channel 91, which may be riveted or otherwise secured to the strap 42 as indicated at 93. Such channel, with its inturned ends, 95 and 97 may be supplied with a date strip, which can be removed and replaced from time to time, in lieu of the day to day graduations such as 66 applied directly to the sheet material as indicated in Figure 4. The individual pockets 87 may be formed from sheet metal and the marginal portion 90 in that case need not be secured to the board 20, so as to permit removal of a pocket, which can be effected by detaching its supporting strap at the strap ends. Thus a pocket may be bodily moved, for replacement or rearrangement to a different position on the board.

Figure 2:
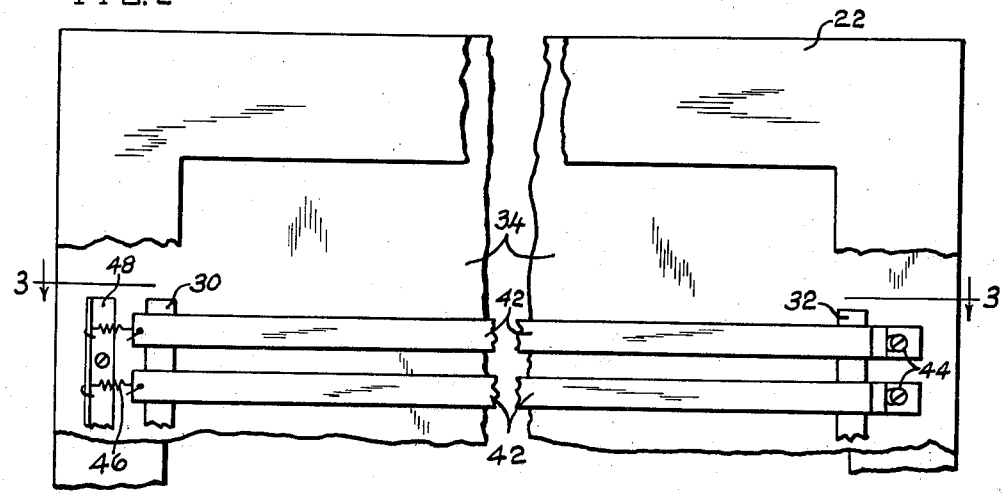
Figure 2 is an enlarged fragmentary view of the board with parts broken away.
Figure 3:
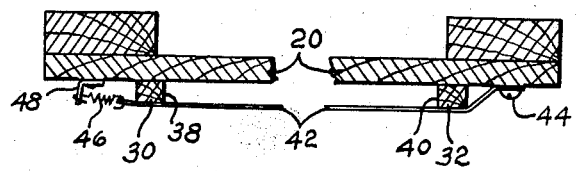
Figure 3 is a fragmentary sectional view taken on the line 3—3 of Figure 2.

In the form of board shown in Figure 10, the spaced straps 43 are tensioned at either end by fastenings located beneath the frame 110 as described in connection with Figures 2 and 3, and at one end a series of pockets 112, formed of sheet material, folded for example as in Figure 4 or Figure 7, are provided to receive job cards or purchase order cards, or such other cards as desired, a job card 114 and purchase order card 116 being shown for illustrative purposes. The straps 43 are exposed for substantially the remainder of their length, and marker clips 118 of varying colors are provided for placing upon the straps to indicate dates in respect to the items indicated by the cards. Such markers may bear letters, or numbers or other indicating means to distinguish one from the other. On a purchase order, for example, a red marker may indicate a date upon which confirmation of the order would normally be received, and markers of other colors may be applied further along to the right to indicate the day on which the parts should be received. Such clips or markers may be of stiff plastic in the form of clips adapted to hang over the straps, and frictionally grip the straps.

Figure 13:
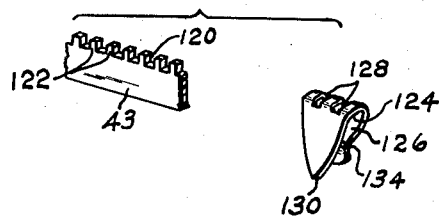
Figure 13 is a fragmentary composite perspective view of a modified strap and marker applicable to Figure 10.

To eliminate the possibility that such markers might be accidentally shifted from the positions in which they are placed, the exposed portion of the straps may have a notched upper edge and the clips or markers may have slots formed in the fold whereby the intervening projections of the strap edge may project through the slots, and thereby resist unintentional movement of the markers. As shown in Figure 13 the strap 43 is provided with notches 120, and intervening projections 122, while the fold 124 of the marker 126 is provided with slots 128 so spaced as to interfit with the notches and projections 120 and 122. The front marker point 130, and rear portion 134 of the clips will be so spaced as to resiliently grip the front and rear faces of the straps 43. Such markers will preferably be made of transparent material, and the day to day indicia lines 136 on the board, behind the straps will thus be visible and cooperate with the markers.

Figure 11:
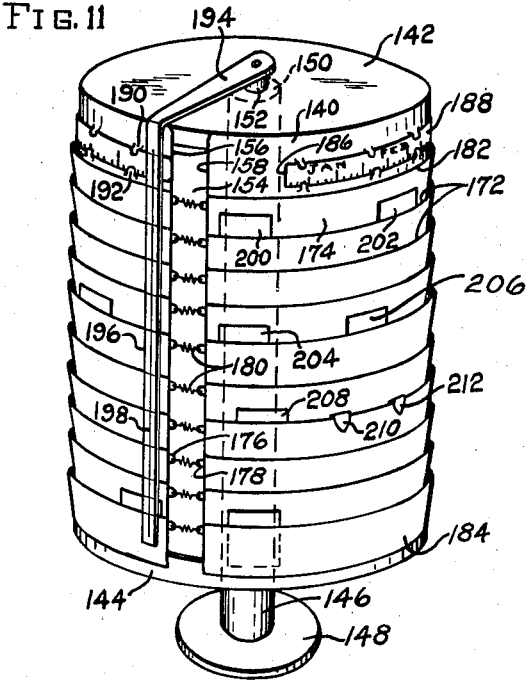
Figure 11 is an application of a schedule board to a cylindrical support.

In Figure 11 there is shown a schedule board arranged in cylindrical form, with the pocket structure wrapped around a cylindrical supporting structure. A cylindrical supporting member of sheet metal, plastic or the like 140 is mounted upon flanged heads 142 and 144, which in turn are mounted for rotation around a vertical axis, on a pedestal 146. The pedestal, which is provided with a fixed base 148, extends through an aperture in the lower head 144 (not shown) and may have a shoulder 150 at its upper end upon which the head 142 is rotatably supported, the pedestal having a reduced diameter portion projecting through the head as at 152.

Figure 12:
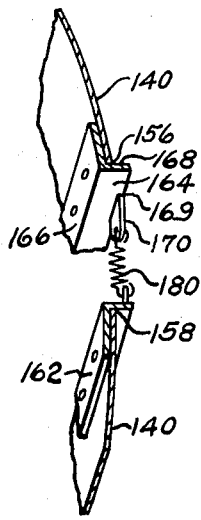
Figure 12 is a fragmentary detail view of a mount for the pocket structure for the cylindrical board of Figure 11.

The cylinder member is provided with a vertical extending opening as at 154, and the spaced edges 156 and 158, of the cylinder member, are provided with angle members 162 and 164, one flange 166 of each of which is riveted or otherwise secured to the cylindrical member adjacent the edge in the manner shown in Figure 12. The other flange 168 projects radially outward beyond the edge 156, and is provided with a plurality of shallow notches 169 to receive the circumferential bands 170 and thereby prevent dislocation. Each band extends around the drum, and extends inside of a fold 172 of the sheet material 174 which is folded to provide a plurality of pockets in overlapping cascade arrangement, as in Figures 1–5 inclusive. Inside each lip fold 172 of each pocket, there is positioned a supporting band 170. The ends 176 and 178 of each band extend into the opening 154 and the perforate ends of each band are joined by a tensioning spring 180. The upper edge 182 of the sheet material may be adhesively secured to the drum, and the lower edge 184 of such material may likewise be suitably secured to the drum.

A suitable arcuate length of the pocket structure, as indicated between the edge 156 and the vertical indicia line 186, may be set aside for the insertion in the various folds of parts order cards, or machine or department identification cards. Above the remainder of the circumference extending from the indicia line 186 around the drum to the edge 158, there is provided a date strip 188 on which are inscribed a series of months, divided into working periods such as weeks and days. Date strips for various sequences of months may be readily substituted from time to time. In order to support such strips a plurality of fingers 190 and 192 may be struck out of the sheet metal of which the drum is composed, such tongues forming in effect a guide channel around the circumference of the drum.

Rigidly supported from the upper end of the pedestal is a radial arm 194 from which depends a transparent strip 196 having a center line 198, which center line may be aligned with the instant day upon the drum, by rotating the drum to bring the actual present day beneath the line. Each day the drum may be rotated by an increment equal to the elapsed time of one day or such other period, so as to bring the current time beneath the today line 198.

In the uppermost drum pocket, there is shown a card 200 which might indicate a particular department through which a particular series of jobs must progress. A card representing a job, and cut to a length to indicate the estimated time therefor may be inserted in the pocket as shown at 202. Such job is indicated as tieing up the department from about the middle of January to the end of the month. It at once becomes evident, that in the absence of further job tickets in such pocket for subsequent periods in the months following, that such department will be available starting February.

In the fourth pocket down, there may be inserted a card 204 to represent a highly specialized machine tool, and a particular job may be scheduled to tie such machine up for the period as indicated by the card 206.

Certain materials may be required by a certain date, and the card 208 may carry order information in connection with an order placed for such material. In such case, a green marker may be placed at a date at which an acknowledgment of the order should be received, and a red marker 212 may be posted as indicated to represent when the order should be received, which time would be selected in advance of the actual requirements. As the drum is advanced from day to day in reference to the today line 198, the superintendent or shop foreman, or other person charged with following up the various matters can at once see how the various operations should be or are progressing. The card 202, for example, may call for the production of 4,000 pieces during the period allotted. From day to day, there may be entered upon such card, the number of pieces completed. Such information may be entered upon the card, so that by pulling the card out of the pocket for inspection such information can be read, or the marginal exposed edge can be marked to so indicate the actual status. The remainder of the card may be used to bear information respecting the job, which can be referred to if suitable progress is not being made, or a quick reference at a glance to such information is required.

It will be seen from the various modified forms of the invention, that the pocket structure affords an economical way of constructing a schedule board, and that such pockets readily hold cards, with their upper margins exposed so as to provide a maximum of information at all times, either on sight, or by lifting the card for inspection. While various materials have been referred to for constructing the various parts, substitutions can be made where desired. The multiplicity of uses to which the board can be put will at once become evident to those charged with the duty of following complicated interrelated scheduling.

An outstanding feature of the invention is the fact that the cards or markers may readily be placed in position, removed, shifted or changed as conditions demand or appear desirable. All this is accomplished without necessitating the shifting of parts, or the moving of other cards, or in any way disturbing the pocket structure. Any changes are made without requiring the use of both hands or the shifting of any parts of the holding device whatsoever. Further, the today line is as easily shifted from day to day so as to provide the desired daily indication.

While several modifications of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A scheduling device comprising a vertical rectangular supporting structure, a pair of spaced vertical elements disposed on said supporting structure defining an extended space therebetween along said structure, horizontally extending bands mounted on said vertical elements, said bands being disposed one above the other in uniformly spaced relation, a series of overlapping pockets of uniform depth formed of sheet material mounted on said structure with each pocket supported on a band, indicia for dividing the length of at least one of said pockets into a plurality of increments representing periods of time, and means mounted for horizontal movement relative to said structure and adapted to extend across the face of said pockets and comprising a vertical line for coordinating said indicia with positions along the length of said pockets.

2. A scheduling device comprising a vertical rectangular supporting structure, a pair of spaced vertical elements disposed on said supporting structure defining an extended space therebetween along said structure, horizontally extending elongated members mounted on said vertical elements, said members being disposed one above the other in uniformly spaced relation, a series of overlapping pockets of uniform depth formed of sheet material mounted on said structure with each pocket supported on a portion only of a member to expose the remainder, and indicia for dividing the length of the exposed portion of at least one of said members into a plurality of increments representing periods, supported by said supporting structure.

3. A scheduling device comprising a vertical rectangular supporting structure, a pair of spaced vertical elements disposed on said supporting structure defining an extended space therebetween along said structure, horizontally extending elongated members mounted on said vertical elements, said members being disposed one above the other in uniformly spaced relation, a series of overlapping pockets of uniform depth formed of sheet material mounted on said structure with each pocket supported on a portion only of a member to expose the remainder, and indicia for dividing the length of the exposed portion of at least one of said members into a plurality of increments representing periods of time supported by said supporting structure, said exposed members having notch means along their length and removable interengaging indicator tabs.

4. A scheduling device comprising a vertical rectangular supporting structure, a pair of spaced vertical elements disposed on said supporting structure defining an extended space theretbeween along said structure, horizontally extending elongated members mounted on said vertical elements, said members being disposed one above the other in uniformly spaced relation, a series of overlapping pockets of uniform depth formed of sheet material mounted on said structure with each pocket supported on a portion only of a member to expose the remainder, indicia for dividing the length of at least one of said pockets into a plurality of increments representing periods of time supported by said supporting structure, and means mounted for horizontal movement relative to said structure and extending across the face of said pockets and comprising a vertical line for coordinating said indicia with positions along the length of the exposed portions of said members.

5. A scheduling device comprising a vertical rectangular supporting structure, a pair of spaced vertical elements disposed on said supporting structure defining an extended space therebetween along said structure, horizontally extending elongated members mounted on said vertical elements, said members being disposed one above the other in uniformly spaced relation, a series of overlapping pockets of uniform depth formed of sheet material mounted on said structure with each pocket supported on a portion only of a member to expose the remainder, indicia for dividing the length of at least one of said pockets into a plurality of increments representing periods of time supported by said supporting structure, said exposed members having notch means along their length and removable inter-engaging indicator tabs, and means mounted for horizontal movement relative to said structure and extending across the face of said pockets and comprising a vertical line for coordinating said indicia with positions along the length of the exposed portions of said members.

6. A scheduling device comprising a vertical rectangular supporting structure, a pair of spaced vertical elements disposed on said supporting structure defining an extended space therebetween along said structure, horizontally extending elongated members mounted on said vertical elements, said members being disposed one above the other in uniformly spaced relation, a series of overlapping pockets of uniform depth formed of sheet material mounted on said structure with each pocket supported on a portion only of a member to expose the remainder, indicia for dividing the length of the exposed portion of at least one of said members into a plurality of increments representing periods of time supported by said supporting structure, and means mounted for horizontal movement relative to said structure and across the face of said pockets and comprising a vertical line for coordinating said indicia with positions along the length of said exposed members.

7. A scheduling device comprising a vertical supporting structure, a pair of spaced vertical elements disposed on said supporting structure defining an extended space therebetween along said supporting structure, horizontally extending supporting elements mounted on said vertical elements, said supporting elements being uniformly vertically spaced one above the other and extending along said supporting structure, and a series of overlapping pockets formed of folded sheet material disposed on said structure, and between said vertical elements and supported from said horizontally extending supporting elements.

8. A scheduling device comprising a vertical supporting structure, a pair of spaced vertical elements disposed on said supporting structure defining an extended space therebetween along said supporting structure, horizontally extending supporting elements mounted on said vertical elements, said supporting elements being uniformly vertically spaced one above the other and extending along said supporting structure, a series of overlapping pockets formed of folded sheet material disposed on said structure, and between said vertical elements and supported from said horizontally extending supporting elements, and horizontally extending means on said supporting structure disposed vertically from said overlapping pockets, said means having indicia thereon representing a calendar period of time.

9. A scheduling device comprising a vertical supporting structure, a pair of spaced vertical elements disposed on said supporting structure defining an extended space therebetween along said supporting structure, horizontally extending supporting elements mounted on said vertical elements, said supporting elements being uniformly vertically spaced one above the other and extending along said supporting structure, a series of overlapping pockets formed of folded sheet material disposed on said structure, and between said vertical elements and supported from said horizontally extending supporting elements, horizontally extending means on said supporting structure disposed vertically from said overlapping pockets, said means having indicia thereon representing a calendar period of time, and a date line supporting means depending across said indicia bearing means and said pockets and mounted on said supporting structure.

10. A scheduling device comprising a vertical supporting structure, a pair of spaced vertical elements disposed on said supporting structure defining an extended space therebetween along said supporting structure, horizontally extending supporting elements mounted on said vertical elements, said supporting elements being uniformly vertically spaced one above the other and extending along said supporting structure, a series of overlapping pockets formed of folded sheet material disposed on said structure, and between said vertical elements and supported from said horizontally extending supporting elements, horizontally extending means on said supporting structure disposed vertically from said overlapping pockets, said means having indicia thereon representing a calendar period of time, and a date line supporting means depending across said indicia bearing means and said pockets and relatively movable horizontally along the length thereof with respect thereto.

References Cited in the file of this patent

UNITED STATES PATENTS

| 339,173 | Heaton | Apr. 6, 1886 |
| 458,358 | Cole | Aug. 25, 1891 |
| 956,175 | Rieckhoff | Apr. 26, 1910 |
| 1,302,849 | Rand | May 6, 1919 |
| 1,823,564 | Hutchings | Sept. 15, 1931 |
| 2,097,835 | Epps | Nov. 2, 1937 |
| 2,490,411 | Burgess | Dec. 6, 1949 |
| 2,608,012 | Jackson | Aug. 26, 1952 |

FOREIGN PATENTS

| 399,570 | Great Britain | Oct. 12, 1933 |
| 546,765 | Great Britain | July 29, 1942 |